Dec. 16, 1958  H. M. SHAFER  2,864,745
GLAUCARUBIN AMEBICIDE
Filed Nov. 14, 1956
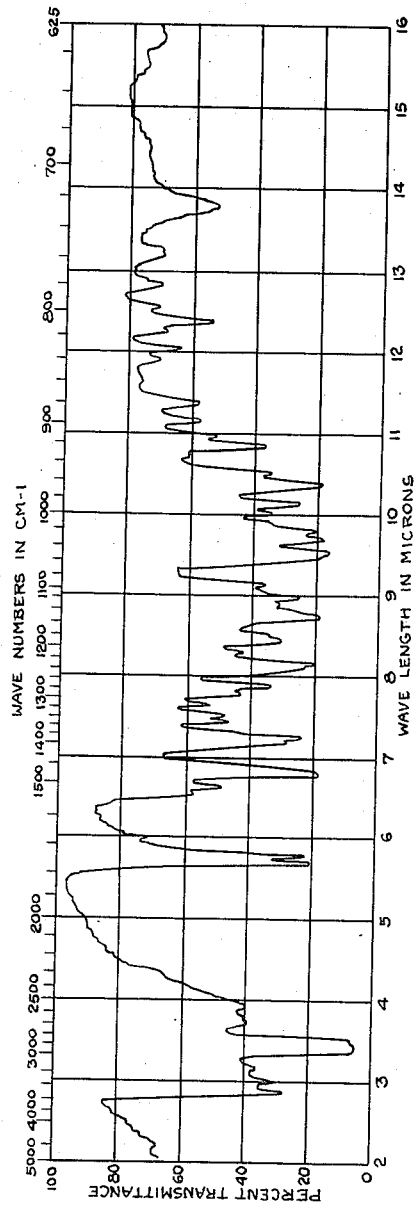
INVENTOR.
HENRY M. SHAFER
BY
*Howard E. Thompson Jr.*
ATTORNEY.

2,864,745
GLAUCARUBIN AMEBICIDE

Henry M. Shafer, Elizabeth, N. J., assignor to Merck & Co., Inc., Rahway, N. J., a corporation of New Jersey Application November 14, 1956, Serial No. 622,212

3 Claims. (Cl. 167—65)

This invention is concerned generally with compounds having antiamebic activity and with procedures for preparing them. More particularly, the invention relates to the new chemical compound, glaucarubin, derived from the fruit kernels of the plant *Simarouba glauca* which compound possesses high activity against *E. histolytica* and has been demonstrated to be extremely effective in the treatment of amebiasis.

This application is a continuation-in-part of copending application Serial No. 304,645, filed August 15, 1952, now abandoned.

*Simarouba glauca* is a plant species which is distributed chiefly through Central America, Mexico, southern Florida, and Jamaica. The fruit of this plant is a source of edible oil which is obtained by first removing the hulls and them compressing the separated fruit kernels. The resulting meal, which is substantially oil free, is called *Simarouba glauca* press cake or Aceituno meal. This meal, which is rather high in protein, would be useful as an animal feed, but contains bitter components, making it unsuitable for this use. In accordance with a preferred embodiment to my invention, glaucarubin can be obtained in substantially pure form from Aceituno meal or alternatively from the whole fruit kernels of *Simarouba glauca*.

The preparation of pure glaucarubin from Aceituno meal is conveniently carried out by extracting the Aceituno meal with water, using about 100 gallons of water per hundred pounds of meal. If the meal is in the form of a relatively solid cake, it should be soaked in the water for a time to cause disintegration. The temperature of the water is then raised to about 70° C. for the actual extraction, and the mixture is moderately agitated, while maintaining a temperature of about 70° C. for a period of about three hours, until extraction is substantially complete. If desired, the extraction may be conducted at lower temperatures down to about room temperature, although at such lower temperatures, the extraction is much slower and less efficient; at temperatures substantially higher than 70° C., there may be partial destruction or decomposition of the product being recovered.

The slurry or extraction mixture is filtered while hot, and the resulting filter cake is washed with about five to ten gallons of hot water; the primary filtrate and wash water are combined and held for further processing. In order to insure complete extraction of the desired material, the filter cake is again extracted with about 100 gallons of water at 70° C. Although not essential, it is desirable to add to the second extraction a small quantity of acetic acid. The acetic acid appears to aid in obtaining a complete and thorough extraction. After extraction for about three hours with agitation at a temperature of about 70° C., the slurry is again filtered and the cake washed as before with about five to ten gallons of hot water. The resulting filtrate and wash are then combined with the primary filtrate and wash.

The combined filtrates or total aqueous extracts are cooled to about room temperature and filtered to remove any residual solids from solution. The clarified aqueous extract is then concentrated to about 70 gallons at a temperature below about 50° C., thus reducing the volume to about one-third the original volume. The resulting concentrate is cooled to room temperature or below and filtered to remove any tar or gum that may have separated. The presence of tar or gum at this stage of the process will vary depending upon the starting material and the manner in which the primary extraction has been carried out. It has been found, however, that unless any tar or gum present in the initial extract is removed by the procedure described, it will seriously interfere with the further concentration and crystallization steps hereinafter described.

After removal of such tar or gum, the concentrate is further evaporated at a temperature below about 50° C. to about one-fourth the volume, i. e., 70 gallons is concentrated to about 15–20 gallons. This concentrate is cooled to a temperature of about 0–5° C. and allowed to stand for an extended period, such as overnight, whereupon there is a separation of crude crystalline glaucarubin therefrom. The crude crystals thus formed are removed by filtration and the mother liquors again concentrated to about one-half volume and cooled to permit separation of a second batch of crude glaucarubin crystals. The two batches of crude glaucarubin crystals are combined and dried preparatory to further purification.

The crude glaucerubin crystals obtained as above described from 100 pounds of Aceituno meal are slurried with about seven-and-one-half gallons of anhydrous methanol and refluxed until the crystals dissolve. The hot solution is then filtered and the resulting filter cake washed with methanol. The filter cake is then again extracted with an additional seven-and-one-half gallon quantity of anhydrous methanol in the manner described, and filtered. The methanol filtrates and washes are combined and concentrated at atmospheric pressure until crystals begin to appear, i. e., generally after concentration to about one-fifteenth volume. The solution is then cooled to about 0–5° C. and allowed to stand for crystallization to go substantially to completion. The resulting crystals are filtered off and the mother liquors are further concentrated and cooled to collect a second crop of crystals. The two crops of crystals are then combined and may be further purified by re-dissolving in methanol, filtering through activated charcoal, and recrystallizing after concentration of the methanol filtrate.

The purified crystalline glaucarubin thus obtained is colorless and odorless and is estimated to have a purity of about 96–97%. It has the formula $C_{25}H_{36}O_{10}$ and melts at 262–263° C. with decomposition (capillary tube). It has a molecular weight by alkali titration of 482 and exhibits an optical rotation in pyridine (1%) of +45°. and in methanol (0.3%) of +89°. By analysis, the product contained 60.60% carbon and 7.38% hydrogen. It reacts with and decolorizes a potassium permanganate solution in about three to four minutes. The solubility characteristics of glaucarubin are shown in the following tabulation:

Mg./ml. in solvent:
>3.5, <4.8 _____ Acetic Acid.
>20.8, <26.2 _____ Sodium carbonate (percent solution).
>200 _____ Pyridine.

Glaucarubin is also characterized by its infra-red absorption band positions as disclosed in connection with the example hereinafter presented.

When glaucarubin is employed clinically as a therapeutic agent, a dosage of 20 to 200 mg./day administered orally for at least 10 days has been found extremely effective in the treatment and cure of amebiasis with no significant evidence of toxicity. If desired, higher dosage e. g. 300 mg./day can be safely administered. Convenient dosage forms include capsules or tablets in which glaucarubin is combined with solid diluents such as corn starch, lactose, talc, stearic acid, magnesium stearate, gums, and the like, and may contain 10 to 100 mg. of glaucarubin per dosage unit.

When glaucarubin is reacted with acetic anhydride in pyridine on a steam bath, two acetylated derivatives are obtained from the reaction mixture. One derivative was found to be hexaacetyl-glaucarubin, $C_{25}H_{30}O_{10}(Ac)_6$; M. P. 162° C.; $[\alpha]$ +49° pyridine; and without infra-red absorption in the hydroxyl band. The second compound isolated was found to be pentaacetyl-glaucarubin, $C_{25}H_{31}O_{10}(Ac)_5$; M. P. 227° C.; $[\alpha]$ +26° pyridine; and slight infra-red absorption in the hydroxyl band.

Glaucarubin can also be hydrogenated, taking up one mole of hydrogen to form di-hydro-glaucarubin.

The use of the fruit kernel of Simarouba glauca is essential in carrying out my invention since all efforts to obtain glaucarubin from other parts of the plant, including root, stems, bark and leaves, have failed to yield any glaucarubin.

The following example will serve to show details of a preferred method for preparing glaucarubin, the new product of the present invention, but it is to be understood that this example is given for purposes of illustration and not of limitation.

EXAMPLE

One hundred pounds of Aceituno meal (S. glauca press cake) was charged in a jacketed kettle equipped with an agitator. One hundred gallons of water was added and the mass allowed to soak for about 12–16 hours without agitation. This soaking period resulted in disintegration of the press cake. The agitator was then started and the slurry heated at about 70° C. for about 3 hours. About 30 pounds of filter aid (diatomaceous silica) was added to the slurry and mixed well. The slurry was then filtered (A) while hot in a plate and frame press. The filtrate (A) was not sparkling clear because a colloidal material precipitated upon cooling. The cake (1) was washed in place with about 10 gallons of hot water and blown relatively dry with air. Then the cake (1) was reslurred in 100 gallons of water, 150 ml. of glacial acetic acid added with agitation, and the slurry heated at 70° C.

This slurry was then filtered (B), washed and dried as before. The filtrate (B) and wash were combined with the primary filtrate (A) and wash to give a total volume of 220 gallons.

The combined filtrate was cooled to room temperature and clarified by filtering (C) through a filter precoated with ¼ inch of diatomaceous silica. The filter cake (2) was washed in place with room temperature water until the effluent was practically colorless. The combined clarified filtrate (C) and wash water were concentrated under vacuum (27 inches Hg or better) at a temperature below 50° C. to a volume of about 70 gallons. The concentrate was cooled to room temperature and a heavy tar or gum settled out. (In other batches only a small quantity of tar was obtained at this point, most of which remained suspended.) The cloudy supernatant was decanted and concentrated in a circulating vacuum evaporator to a volume of about 15–20 gallons at a temperature below 50° C. The concentrate was stored in the cold room overnight for crystallization of crude glaucarubin. After overnight storage, 1% of diatomaceous silica was added and the slurry filtered (D) on an 18-inch ceramic filter pot precoated with ⅛ inch to ¼ inch diatomaceous silica. The glaucarubin filter cake (3) was washed with water at 0–5° C. until the wash was practically colorless. The filter cake (3) was dried at 40–50° C. at this point, it weighed 1500–2000 gms. The filtrate (D) was concentrated, as before, to 8–10 gallons, cooled and a second filter cake (4) obtained which was also dried at 40–50° C. to give additional crude glaucarubin.

The two dry cakes (3 and 4) were combined and slurried with 7.5 gallons of anhydrous methanol at reflux temperature for one hour. The hot solution was filtered (E) and the cake (5) washed with about 1 gallon of methanol. The cake (5) was reslurried in 7.5 gallons of anhydrous methanol and heated at reflux temperature for one hour. The slurry was filtered (F) and the cake (6) washed with two displacement volumes of methanol.

The methanol extracts (E and F) and washes were combined and concentrated at atmospheric pressure until the appearance of crystals. The volume at this point was about one gallon. The slurry was cooled to 0–5° C. and stored overnight in the cold room to allow completion of the crystallization. The crystalline product (7) was harvested by filtration (G) on a Buchner funnel and washed with methanol at 0–5° C. to remove mother liquors. The crystals were dried at 40–50° C. The mother liquors (G) were concentrated and a second batch of crystals (8) obtained in a similar manner as the first batch.

The two crops (7 and 8) of crystals were combined and slurried with 60 ml. of methanol per gram of crystals, then refluxed until the crystals dissolved. After cooling slightly, 10 gms. of activated charcoal was added, the solution refluxed for 15 minutes, and then filtered (H) while hot. The charcoal cake was washed with 200 ml. of hot methanol. The filtrate (H) and wash were combined and concentrated until the appearance of crystals (9) which were filtered (I) off. The mother liquors (I) were further concentrated and a second batch of crystals (10) was obtained. The two batches of crystals (9 and 10) which consisted of substantially pure glaucarubin were combined and were found to have the following characteristics: Purity (phase analysis), 96.7+0.5%; melting point 250–255° C. with decomposition (micro hot stage) and 260–263° C. with decomposition (capillary tube); optical rotation, pyridine (1%) +45°, methanol (0.3%) +89°; molecular weight 482 (alkali titration); percent C, 60.60; percent H, 7.38; reaction with $KMnO_4$, 3–4 minutes. Solubility of the product was as follows in mg./ml.: acetic acid, >3.5, <4.8; sodium carbonate (1% solution in water), >20.8, <26.2; pyridine, >200.

The crystalline glaucarubin was mulled in petrolatum and the infra-red absorption band positions determined on a Baird infra-red spectrophotometer using NaCl optics and the results obtained are shown in the accompanying drawing and following tabulation:

*Wave length in microns*

| | |
|---|---|
| 2.93 | 9.69 |
| 2.99 | 9.81 |
| 5.69 | 10.02 |
| 5.78 | 10.13 |
| 5.99 | 10.38 |
| 7.43 | 10.51 |
| 7.53 | 10.83 |
| 7.63 | 10.98 |
| 7.80 | 11.18 |
| 7.89 | 11.39 |
| [1] 8.18 | 11.91 |
| [1] 8.43 | 12.07 |
| 8.72 | 12.27 |
| 8.80 | 12.38 |
| 8.90 | 12.58 |
| 8.98 | 12.82 |
| 9.14 | [1] 13.22 |
| [1] 9.55 | 13.81 |

[1] Multiple bands, unresolved.
Bands at 3.4 and 6.0 to 7.4 were omitted because of vehicle interference.

This new substance was hydrogenated in methanol with platinum and the glaucarubin absorbed one mole of hydrogen, indicating formation of di-hydro glaucarubin.

The glaucarubin was hydrolyzed using 0.1 N sodium hydroxide at 25° C. for 60 hours and two degradation products recovered from the reaction mixture. One degradation product was proven to be α-methyl-α-hydroxy butyric acid: Calcd. for $C_5H_{10}C_3$ (118): I, 50.83; H, 8.53. Found: C, 51.26; H, 8.52. Melting point, 73–75° C.; [α]+9.2° in chloroform. The other product had the formula: $C_{20}H_{28}O_8$ (398): Calcd. for C, 60.6; H, 7.1. Found: C, 60.87; H, 7.27. Melting point, 275–285° C.; [α]+30° pyridine. Therefore, allowing for one mole of water, it is seen that the new substance has the formula: $C_{25}H_{36}O_{10}$ (496); Calcd. for C, 60.5; H, 7.3. Found: C, 60.60; H, 7.38.

Glaucarubin was acetylated with acetic anhydride in pyridine on a steam bath, and two derivatives isolated from the reaction mixture:

(a) Hexaacetylglaucarubin:
Calcd. for $C_{25}H_{30}O_{10}(Ac)_6$ (748): C, 59.3; H, 6.4; Ac, 34.5.
Found: C, 59.34; H, 6.48; Ac, 33.6.
M. P. 162° C.; optical rotation [α]+49° pyridine. The infra-red curve showed no hydroxyl absorption.

(b) Pentaacetylglaucarubin:
Calcd. for $C_{25}H_{31}O_{10}(Ac)_5$ (706) C, 59.5; H, 6.6; Ac, 30.5.
Found: C, 60.01; H, 6.54; Ac, 30.4.
M. P. 227° C.; optical rotation [α]+26° pyridine. The infra-red curve showed slight hydroxyl absorption.

Various changes and modifications in the procedures herein disclosed will occur to those skilled in the art, and to the extent that such changes and modifications fall within the purview of the appended claims, it is to be understood that they constitute part of my invention.

I claim:

1. The compound glaucarubin, an organic substance adapted for the therapeutic treatment of amebiasis, having the empirical formula $C_{25}H_{36}O_{10}$, forming a di-hydro derivative upon hydrogenation, forming a hexaacetyl derivative having a melting point of 162° C. and optical rotation in pyridine of +49°, and a pentaacetyl monohydroxy derivative having a melting point of 227° C. and optical rotation in pyridine of +26°, and when in crystalline form being further characterized as exhibiting characteristic infra-red absorption at the following wave lengths expressed in microns: 2.93, 2.99, 5.69, 5.78, 5.99, 7.43, 7.53, 7.63, 7.80, 7.89, 8.18, 8.43, 8.72, 8.80, 8.90, 8.98, 9.14, 9.55, 9.69, 9.81, 10.02, 10.13, 10.38, 10.51, 10.83, 10.98, 11.18, 11.39, 11.91, 12.07, 12.27, 12.38, 12.58, 12.82, 13.22, and 13.81 as shown in the accompanying drawing, melting with decomposition at 262–263° C., exhibiting optical rotation in pyridine (1%) of +45° and in methanol (0.3%) of +89°, and having solubilities expressed in mg./ml. as follows: >3.5 and <4.8 in acetic acid; >20.8 and <26.2 in 1% sodium carbonate solution; and >200 in pyridine.

2. An antiamebic preparation adapted for oral administration comprising glaucarubin as defined in claim 1 and a pharmaceutical carrier.

3. An oral antiamebic preparation in dosage unit form comprising a solid pharmaceutical carrier and 10 to 100 mg. per dosage unit of glaucarubin as defined in claim 1.

References Cited in the file of this patent

Ham et al.: J. A. C. S., 1954, pp. 6066–6068.
Karel: Dictionary of Antibiosis," page 270 (1951).